April 18, 1961     H. C. HARRISON ET AL     2,980,476

COMPRESSOR PISTON

Filed Sept. 23, 1958

INVENTORS
HENRY C. HARRISON
HENRY HARRISON
BY
THEIR ATTORNEY

United States Patent Office 2,980,476
Patented Apr. 18, 1961

2,980,476

COMPRESSOR PISTON

Henry C. Harrison, Port Washington, and Henry Harrison, Locust Valley, N.Y., assignors to Ingersoll-Rand Company, New York, N.Y., a corporation of New Jersey Filed Sept. 23, 1958, Ser. No. 762,807

8 Claims. (Cl. 309—14)

This invention relates to a piston and more particularly to a fabricated piston of a lightweight sheet construction and a method of forming the same.

An object of this invention is to provide a durable lightweight piston.

Figure 1:
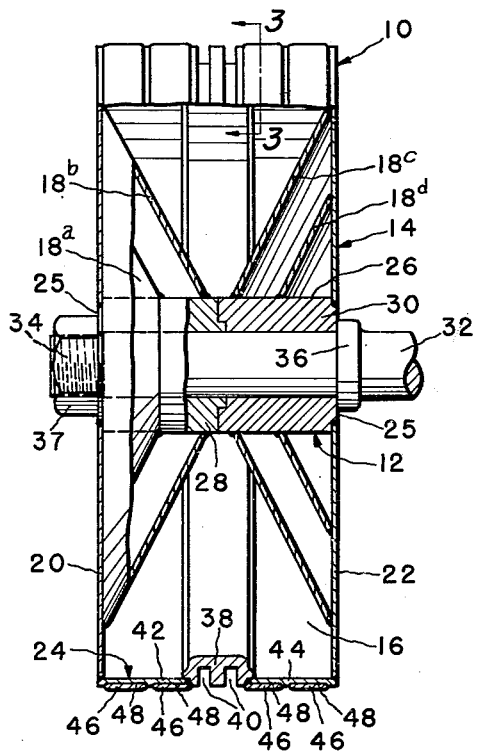
Figure 2:
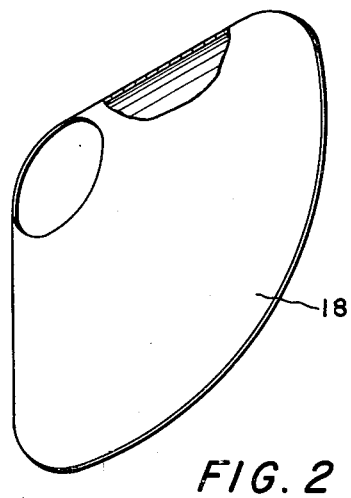
Figure 3:
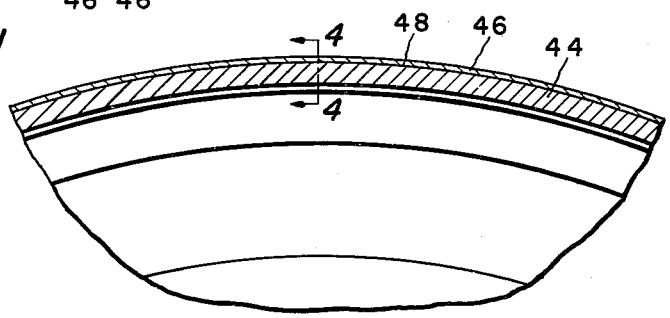
Figure 4:
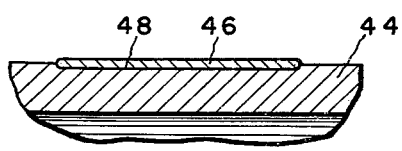

Further objects will become obvious from the following specification and drawings in which Figure 1 is a side view, partly in section, embodying a preferred form of the invention, Fig. 2 is a perspective view, partly in section, showing a frusto-conically shaped cone embodied in Fig. 1, Fig. 3 is a sectional view of Fig. 1 taken along the line 3—3 looking in the direction of the arrows, and Fig. 4 is a sectional view of Fig. 3 taken along the line 4—4 looking in the direction of the arrows.

Referring to the drawings and first to Fig. 1 in which is shown a piston 10. This piston 10 includes a member, in this instance a hub 12, adapted to be reciprocated and a substantially hollow casing 14 encircling the hub 12 to define a chamber 16. The piston 10 further includes conical members 18 housed in said chamber 16 and connected to said casing 14 and the hub 12 to limit movement therebetween.

In the preferred form of the invention the casing 14 is in the form of a hollow cylinder and includes two opposed circular end plates 20 and 22 and an intermediate peripheral tube 24 connected to the periphery of said plates 20 and 22. The central portions of said plates 20 and 22 define a central opening 25 into the chamber 16 and through which the hub 12 slidably fits to define the inner peripheral surface 26 of said chamber 16. The hub peripheral surface 26, in addition, serves a means for connecting the casing 14 through the end plates 20 and 22 to said hub 12.

The hub 12 includes two hollow cylindrical segments 28 and 30 butted together at their inner ends by complementary flanges. A reciprocatory shaft 32 having a threaded end 34 extends through the hub 12 up to a flanged portion 36 on said shaft 32. The threaded end 34 is adapted to receive a nut 37 which locks the piston 10 between the nut 37 and the shaft flanged portion 36.

In the preferred form of the invention there are two pairs of opposed conical sheet members 18a, 18b, 18c and 18d. These members are frusto-conically shaped with the smaller ends thereof encircling the hub peripheral surface 26 and connected thereto. The wider ends of the members 18a and 18b, are connected to the casing end plate 20 and the wider ends of the members 18c and 18d are connected to the casing end plate 22.

The tube 24 of the casing 16 includes three separate cylindrically shaped segments, the center of which is a piston ring carrier 38. In order to hold the piston rings (not shown), the carrier 38 has two circumferential slots 40 in its outer surface. The outer cylindrical segments 42 and 44 are suitably connected to the ring carrier 38 and are adapted to contain wearing sleeves 46. To achieve this end, the segments 42 and 44 define several outer peripheral grooves 48 into which the sleeves 46 fit extending radially from the piston 10.

In the preferred form of the invention various parts of the piston 10 that are to be joined are welded together along their appropriate surfaces or edges to form seams therebetween. The steps in uniting the component parts, include placing the end plate 20, hub segment 28 and conical sheet member 18a in their final positional relationship, welding the smaller end of the member 18a to the hub segment 28 and the wider end of the member 18a to the plate 20. The plate 18b is then properly positioned and welded at its smaller end to the hub segment 28 and the wider end to the plate 20. An identical welding process is used for welding the conical members 18c and 18d to the hub segment 30 and the plate 22. The plates 20 and 22 at their inner ends may be welded to hub peripheral surface 26 at any time during the process.

The component parts that comprise the tube 24, that is the carrier 38 and outer segments 42 and 44, may be welded to each other before the outer segments 42 and 44 are welded to the end plates 20 and 22. If this method is employed, the carrier 38 is welded on its outer opposed peripheral ends to the segments 42 and 44. The hub segments 28 and 30 and parts welded thereto, conical members 18 and piston end plates 20 and 22, are then placed inside the casing chamber 16 from opposite ends of the casing 14 with the complementary hub flanges butted together therein. The outer ends of the end plates 20 and 22 are then welded to the appropriate casing segments 42 and 44.

We claim:

1. A piston, comprising a hub, a substantially hollow casing encircling said hub and secured thereto and having opposed ends, a pair of conical sheet members arranged in opposed relationship in said casing, each having its end of smaller diameter encircling and secured to said hub, and each secured at its opposite end to its associated end of said casing.

2. A hollow piston of sheet metal construction, comprising a hub, and a tubular member encircling said hub, sheet members secured to said hub and said tubular member forming the end walls of such piston, and a substantially frusto-conical sheet member having its smaller diameter secured to said hub and having its larger diameter secured to one of said walls for rigidity.

3. A piston comprising a hub, a casing having closed ends and the ends each being provided with an opening to receive the hub and the ends being secured to the hub, a first member in the shape of a frustum of a cone positioned in the casing with the smaller diameter of the member surrounding the hub and secured thereto and the larger diameter of the member secured to one end of the casing, and a second member in the shape of a frustum of a cone positioned in the casing with the smaller diameter of the member surrounding the hub and secured thereto and the larger diameter of the member secured to the other end of the casing.

4. A piston comprising a hub, a casing including a tube and circular end plates secured to the tube and the circular end plates each being provided with an opening to receive the hub and the circular plates being secured to the hub, a first plurality of members each in the shape of a frustum of a cone disposed in spaced relation and positioned in the casing with the smaller diameters of the members surrounding the hub and secured thereto and the larger diameters of the members secured to one of the circular plates, and a second plurality of members each in the shape of a frustum of a cone disposed in spaced relation and positioned in the casing with the smaller diameters of the members surrounding the hub and secured thereto and the larger diameters of the members secured to the other of the circular plates.

5. A piston comprising a hub, a casing including a first cylindrical section and a second cylindrical section and a third cylindrical section arranged in substantially end to end relation and secured together to form a tube and the first and third cylindrical sections each being provided with a groove and a wear sleeve disposed in each of the grooves in the first and third cylindrical sections and circular end plates secured to the other ends of the first and third cylindrical sections and the circular end plates each being provided with an opening to receive the hub and the circular plates being secured to the hub, a first plurality of members each in the shape of a frustum of a cone disposed in spaced relation and positioned in the casing with the smaller diameters of the members surrounding the hub and secured thereto and the larger diameters of the members secured to one of the circular plates, and a second plurality of members each in the shape of a frustum of a cone disposed in spaced relation and positioned in the casing with the smaller diameters of the members surrounding the hub and secured thereto and the larger diameters of the members secured to the other of the circular plates.

6. A piston, comprising a hub, a substantially hollow casing encircling said hub including an end plate, the end plate being secured to said hub, and a substantially conical sheet member in said casing having its larger diameter secured to said end plate and having its smaller diameter secured to said hub, and having a second conically shaped member having its larger diameter secured to said end plate and having its smaller diameter secured to said hub and spaced from the first conical member.

7. A piston of sheet construction including a hub, and a sheet-like end wall adapted to be secured to said hub, a substantially conical support member having its larger diameter secured to said end wall and having its smaller diameter secured to said hub, and having a second conical support member having its larger diameter secured to said end plate and having its smaller diameter secured to said hub and being spaced from said first conical support member.

8. A piston comprising a hub, a pair of end plates spaced apart and adapted to be secured to said hub, means for connecting said end plates to one another, a frustro conical sheet member surrounding said hub member and having its smaller diameter secured thereto and its larger diameter secured to one of said end plates.

References Cited in the file of this patent
UNITED STATES PATENTS

| | | |
|---|---|---|
| 841,703 | Miller | Jan. 22, 1907 |
| 2,068,859 | Jones | Jan. 26, 1937 |

FOREIGN PATENTS

| | | |
|---|---|---|
| 947,476 | Germany | Aug. 16, 1956 |